United States Patent
Neul et al.

(10) Patent No.: US 11,953,323 B2
(45) Date of Patent: Apr. 9, 2024

(54) MICROMECHANICAL RATE-OF-ROTATION SENSOR SET-UP, RATE-OF-ROTATION SENSOR ARRAY AND CORRESPONDING MANUFACTURING METHOD

(71) Applicant: Robert Bosch GmbH, Stuttgart (DE)

(72) Inventors: Reinhard Neul, Stuttgart (DE); Andreas Lassl, Korntal-Muenchingen (DE); Burkhard Kuhlmann, Reutlingen (DE); Jan-Timo Liewald, Kusterdingen (DE); Matthias Kuehnel, Boeblingen (DE); Niels Bode, Stuttgart (DE); Nils Felix Kuhlmann, Ehningen (DE); Odd-Axel Pruetz, Nuertingen (DE); Peter Degenfeld-Schonburg, Renningen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 103 days.

(21) Appl. No.: 17/793,025

(22) PCT Filed: Jan. 29, 2021

(86) PCT No.: PCT/EP2021/052067
§ 371 (c)(1),
(2) Date: Jul. 14, 2022

(87) PCT Pub. No.: WO2021/165015
PCT Pub. Date: Aug. 26, 2021

(65) Prior Publication Data
US 2023/0038004 A1    Feb. 9, 2023

(30) Foreign Application Priority Data

Feb. 19, 2020 (DE) .................. 10 2020 202 158.9

(51) Int. Cl.
*G01C 19/5747* (2012.01)
*G01C 19/5712* (2012.01)

(52) U.S. Cl.
CPC ..... *G01C 19/5712* (2013.01); *G01C 19/5747* (2013.01)

(58) Field of Classification Search
CPC ............ G01C 19/5712; G01C 19/5747; G01C 19/5762
See application file for complete search history.

(56) References Cited

U.S. PATENT DOCUMENTS 10,697,774 B2 * 6/2020 Prikhodko .......... G01C 19/574
2010/0192690 A1 * 8/2010 Classen ............. G01C 19/5747
73/504.12

(Continued)

FOREIGN PATENT DOCUMENTS

DE    102010061755 A1    5/2012
DE    102010062095 A1    5/2012

(Continued)

OTHER PUBLICATIONS

International Search Report for PCT/EP2021/052067, dated May 19, 2021.

*Primary Examiner* — David J Bolduc
(74) *Attorney, Agent, or Firm* — NORTON ROSE FULBRIGHT US LLP; Gerard A. Messina (57) ABSTRACT

A micromechanical rate-of-rotation sensor set-up, including a first rate-of-rotation sensor device capable of being driven rotationally by a driving device via a drive frame device, so as to oscillate about a first axis, and is for measuring a first outer rate of rotation about a second axis and a second outer rate of rotation about a third axis; and a second rate-of-rotation sensor device capable of being driven by the driving device via the drive frame device, so as to oscillate linearly along the second axis, and is for measuring a third outer rate (Continued)

of rotation about the first axis. The first rate-of-rotation sensor device is connected to the second rate-of-rotation sensor device by the drive frame device. The drive frame device includes a first and second drive frame, which may be driven by the driving device in phase opposition, along the third axis, in an oscillatory manner.

13 Claims, 8 Drawing Sheets

(56) References Cited

U.S. PATENT DOCUMENTS

| | | | |
|---|---|---|---|
| 2011/0023600 A1 | 2/2011 | Wrede et al. | |
| 2011/0283794 A1* | 11/2011 | Sattler | G01C 19/56 73/504.12 |
| 2012/0060604 A1* | 3/2012 | Neul | G01P 3/44 73/504.12 |
| 2014/0260610 A1* | 9/2014 | McNeil | G01C 19/5712 73/504.12 |
| 2016/0084654 A1* | 3/2016 | Senkal | G01C 19/5747 73/504.12 |
| 2016/0169676 A1 | 6/2016 | Rocchi et al. | |
| 2016/0231115 A1* | 8/2016 | Piirainen | G01C 19/5712 |
| 2016/0231116 A1* | 8/2016 | Piirainen | G01C 19/5712 |
| 2016/0305781 A1* | 10/2016 | Piirainen | G01C 19/5747 |
| 2016/0334215 A1* | 11/2016 | Kato | G01C 19/5719 |
| 2016/0370182 A1* | 12/2016 | Shao | G01C 19/5769 |
| 2018/0074090 A1* | 3/2018 | Boysel | G01D 21/02 |
| 2018/0202808 A1* | 7/2018 | Schmidt | G01C 19/5747 |
| 2018/0231381 A1* | 8/2018 | Lassl | G01C 19/5747 |
| 2018/0283869 A1* | 10/2018 | Kato | G01C 19/5769 |
| 2018/0321039 A1* | 11/2018 | Neul | G01C 19/5712 |
| 2019/0017823 A1* | 1/2019 | Shao | G01C 19/5769 |
| 2019/0078887 A1 | 3/2019 | Bode et al. | |
| 2019/0187169 A1* | 6/2019 | Tang | G01C 19/5656 |
| 2019/0383612 A1* | 12/2019 | Geisberger | G01C 19/5747 |
| 2020/0355500 A1* | 11/2020 | Pruetz | G01C 19/5712 |
| 2021/0381832 A1* | 12/2021 | Prikhodko | G01C 19/5712 |
| 2022/0228864 A1* | 7/2022 | Reinmuth | G01C 19/5719 |
| 2022/0260372 A1* | 8/2022 | Geisberger | G01C 19/574 |

FOREIGN PATENT DOCUMENTS

| | | |
|---|---|---|
| DE | 102011006394 A1 | 10/2012 |
| DE | 112013005703 T5 | 9/2015 |
| DE | 102017215503 A1 | 3/2019 |
| DE | 102017216010 A1 | 3/2019 |
| EP | 0895059 A2 | 2/1999 |
| JP | 2012242240 A | 12/2012 |
| JP | 5503796 B1 | 5/2014 |
| WO | 9639615 A1 | 12/1996 |

* cited by examiner

MICROMECHANICAL RATE-OF-ROTATION SENSOR SET-UP, RATE-OF-ROTATION SENSOR ARRAY AND CORRESPONDING MANUFACTURING METHOD

FIELD

The present invention relates to a micromechanical rate-of-rotation sensor set-up, a rate-of-rotation sensor array, and a corresponding manufacturing method.

BACKGROUND INFORMATION

A micromechanical rate-of-rotation sensor set-up is described in German Patent Application No. DE 10 2017/216010 A1 and U.S. Patent Application Publication No. US 2019/0078887 A1. This includes a rotatably drivable, first rate-of-rotation sensor device and a second rate-of-rotation sensor device drivable in a linearly oscillating manner. Further rate-of-rotation sensors are described in German Patent Application No. DE 10 2010 062 095 A1, PCT Patent Application No. WO 96/39615 A1, and German Patent Application Nos. DE 10 2010 061 755 A1 and DE 10 2011 006 394 A1.

SUMMARY

The present invention provides a micromechanical rate-of-rotation sensor set-up, a micromechanical rate-of-rotation sensor array, and a corresponding manufacturing method.

Advantageous refinements of the present invention are disclosed herein.

An example embodiment of the present invention provides a micromechanical rate-of-rotation sensor set-up, which includes: a first rate-of-rotation sensor device, which is capable of being driven rotationally by a driving device via a drive frame device, so as to oscillate about a first axis, and is for measuring a first outer rate of rotation about a second axis and a second outer rate of rotation about a third axis, the first, second, and third axes being positioned perpendicularly to each other; and a second rate-of-rotation sensor device, which is capable of being driven by the driving device via the drive frame device, so as to oscillate linearly along the third axis, and is for measuring a third outer rate of rotation about the first axis. The first rate-of-rotation sensor device is connected to the second rate-of-rotation sensor device by the drive frame device. The drive frame device includes a first drive frame and a second drive frame, which may be driven by the driving device in phase opposition, along the third axis, in an oscillatory manner. The first rate-of-rotation sensor device capable of being driven rotationally includes a first rotor device, which may be driven about the first axis in an oscillatory manner, and a second rotor device, which may be driven about the first axis in an oscillatory manner in phase opposition to the first rotor device. The first rotor device is tiltable due to the first outer rate of rotation about the second axis, and due to the second outer rate of rotation about the third axis; the second rotor device being tiltable antiparallelly to the first rotor device due to the first outer rate-of-rotation about the second axis and the second outer rate-of-rotation about the third axis. In addition, the first rate-of-rotation sensor device capable of being driven rotationally includes a first coupling device that has a first spring device, by which the first rotor device and the second rotor device are coupled in such a manner, that parallel tilting about the second axis is suppressed and antiparallel tilting about the second axis is enabled; as well as a second coupling device, by which the first rotor device and the second rotor device are coupled in such a manner, that parallel tilting about the third axis is suppressed and antiparallel tilting about the third axis is enabled. A first detection device is used for measuring antiparallel tilting of the first and second rotor devices about the second axis, and a second detection device is used for measuring antiparallel tilting of the first and second rotor devices about the third axis. The second coupling device includes first through third rocker arms; the first rocker arm being connected to the first rotor device and to the first drive frame by spring devices, the second rocker arm being connected to the second rotor device and to the second drive frame by spring devices, and the first and second rocker arms each being connected to the third rocker arm by spring devices. The second coupling device includes fourth through sixth rocker arms; the fourth rocker arm being connected to the first rotor device and the first drive frame by spring devices, the fifth rocker arm being connected to the second rotor device and the second drive frame by spring devices, and the fourth and fifth rocker arms each being connected to the sixth rocker arm by spring devices.

An idea forming the basis of the present invention is the connection of a mono-axial and a biaxial rate-of-rotation sensor via a common driving mechanism. The resulting triaxial rate-of-rotation sensor is robust with regard to external linear and angular acceleration, so that, in particular, the standards for safety-related applications in the automotive field are satisfied.

The micromechanical rate-of-rotation sensor set-up having the common drive mechanism for all three measuring axes provides several advantages over three individual rate-of-rotation sensors. Since there is only one driving mechanism, drive structures, as well as bonding pads and the wiring associated with them, may be eliminated in the sensor core. Consequently, the ASIC may also be built compactly, since only one driving control loop has to be provided. It is particularly advantageous not to have different drive frequencies for the different rate-of-rotation sensors, so that mutual interference, e.g., by parasitic inductive disturbance of the driving forces, may be prevented. In addition, the packaging becomes simpler, and possible malpositioning of the individual rate-of-rotation sensors relative to each other is precluded by the design of the rate-of-rotation sensor set-up of the present invention.

Interference modes, which may produce a spurious signal of a triaxial rate-of-rotation sensor in different ways, e.g., due to (resonant) excitation by external forces (vibration), or due to nonlinear inductive disturbance in the mechanics or the electrostatics of the system, may be prevented. However, if three identical, mono-axial rate-of-rotation sensors are used, then all of the rate-of-rotation sensors have the same interference modes, which lie at different frequencies as a function of the operation, which means that the total number of interference modes triples in a frequency range considered. Thus, in one multiaxial rate-of-rotation sensor, it is possible to further reduce the interference modes by designing the same detection structures to be sensitive, in each instance, for more than only one measuring axis.

According to an example embodiment of the present invention, in each instance, three rocker arms are provided twice; together, the rocker arms connecting the first rotor device, the second rotor device, the first drive frame and the second drive frame.

The rocker arms are rotatable about parallel axes; the middle rocker arm being tilted antiparallelly to the outer rocker arms. Such a construction may be implemented, using a low number of spring devices. A construction including few meandering patterns may allow the rate-of-rotation sensor set-up to be built smaller. In addition, the frequencies of tilting may be adjusted more effectively.

According to one preferred further refinement of the present invention, the linearly drivable, second rate-of-rotation sensor device includes a frame device having a first subframe and a second subframe; the first subframe and the second subframe being able to be driven along the third axis in an oscillatory manner. Thus, the second rate-of-rotation sensor device includes only one detection frame, which is subdivided into a first subframe and a second subframe. The detection frame moves along in response to a driving motion. Due to the third outer rate of rotation about the first axis, the first and the second subframes may be deflected in phase opposition along the second axis, in an oscillatory manner. The frame device is preferably made up of exactly two subframes. By reducing mechanically movable structures, the number of the modes excitable at low frequencies may be advantageously reduced.

According to another preferred further refinement of the present invention, the linearly drivable, second rate-of-rotation sensor device includes a frame device having a first frame and a second frame; the second frame being at least partially surrounded by the first frame: the first frame being able to be driven along the third axis in an oscillatory manner; and the second frame being able to be driven along the third axis in an oscillatory manner, in phase opposition to the first frame; due to the third outer rate of rotation about the first axis, the first and the second frames being able be deflected in phase opposition along the second axis, in an oscillatory manner; and the first frame including a first subframe and a second subframe, and the second frame including a third subframe and a fourth subframe. A third coupling device is provided, by which the first subframe and the third subframe are coupled in such a manner, that in-phase deflection of the first and third subframes along the third axis is suppressed and out-of-phase deflection of the first and third subframes along the third axis is enabled; and a fourth coupling device is provided, by which the second subframe and the fourth subframe are coupled in such a manner, that in-phase deflection of the second and fourth subframes along the third axis is suppressed, and out-of-phase deflection of the second and fourth subframes along the third axis is enabled. A third detection device is used for measuring out-of-phase deflection of the first and second frames along the second axis. Such a rate-of-rotation sensor device may be coupled effectively to the rotationally driveable, first rate-of-rotation sensor device.

According to another preferred further refinement of the present invention, a coupling device for connecting the first partial drive frame and the third partial drive frame, and a coupling device for connecting the second partial drive frame and the fourth partial drive frame, are provided. In this manner, effective linear coupling of the further partial drive frames may be achieved.

According to another preferred further refinement of the present invention, the driving device includes a first drive unit for driving the first drive frame and a second drive unit for driving the second drive frame. This renders symmetric driving possible.

According to another preferred further refinement of the present invention, the driving device includes a single, common drive unit for driving the first drive frame and for driving the second drive frame. This conserves space in the design.

According to another preferred further refinement of the present invention, the first and/or second rotor device have one or more quadrature electrodes, which are configured to interact with quadrature electrodes situated beneath them. This increases the driving accuracy.

According to another preferred further refinement of the present invention, further electrodes, by which quadrature movements may be compensated for and/or test signals may be given, are situated under the first and/or second rotor device. Such a structure may be provided, in particular, in an open-loop control system. In addition, electrodes may be provided for frequency tuning and for detecting the driving motion.

According to another preferred further refinement of the present invention, the first detection device and the second detection device each have a plurality of capacitive plate electrodes, which are situated underneath the first and second rotor devices. This allows the tilting to be detected reliably.

According to another preferred further refinement of the present invention, the third detection device includes a plurality of capacitive comb electrodes, which are situated inside of the first and second frames. This allows antisymmetric deflection to be detected reliably.

According to another preferred further refinement of the present invention, the micromechanical rate-of-rotation sensor set-up includes a further, second rate-of-rotation sensor device; the first rate-of-rotation sensor device being connected to the further, second rate-of-rotation sensor device via the drive frame device. The construction of the second rate-of-rotation sensor device and of the further, second rate-of-rotation sensor device may be identical. In particular, the further, second rate-of-rotation sensor device may also be driven by the driving device via the driving frame device, along the third axis, in a linearly oscillatory manner, in order to measure a third outer rate of rotation about the first axis. The second rate-of-rotation sensor device and the further, second rate-of-rotation sensor device are preferably attached symmetrically relative to the first rate-of-rotation sensor device. By increasing the symmetry, the influence of manufacturing tolerances may be reduced. The entire rate-of-rotation sensor device is symmetric with respect to two perpendicular axes, whose point of intersection lies at the center point of the rate-of-rotation sensor device.

In accordance with an example embodiment of the present invention, it may be particularly advantageous for the micromechanical rate-of-rotation sensor array to include a plurality of micromechanical rate-of-rotation sensor set-ups, which are positioned in the form of an array, are interconnected, and each have a second and a further, second rate-of-rotation sensor device. In this manner, the overall construction may be rendered more symmetrical.

BRIEF DESCRIPTION OF THE DRAWINGS

Additional features and advantages of the present invention are explained below in light of specific embodiments, with reference to the figures.

DETAILED DESCRIPTION OF EXAMPLE EMBODIMENTS

In the figures, the same reference symbols denote identical and/or functionally equivalent elements.

Figure 1:
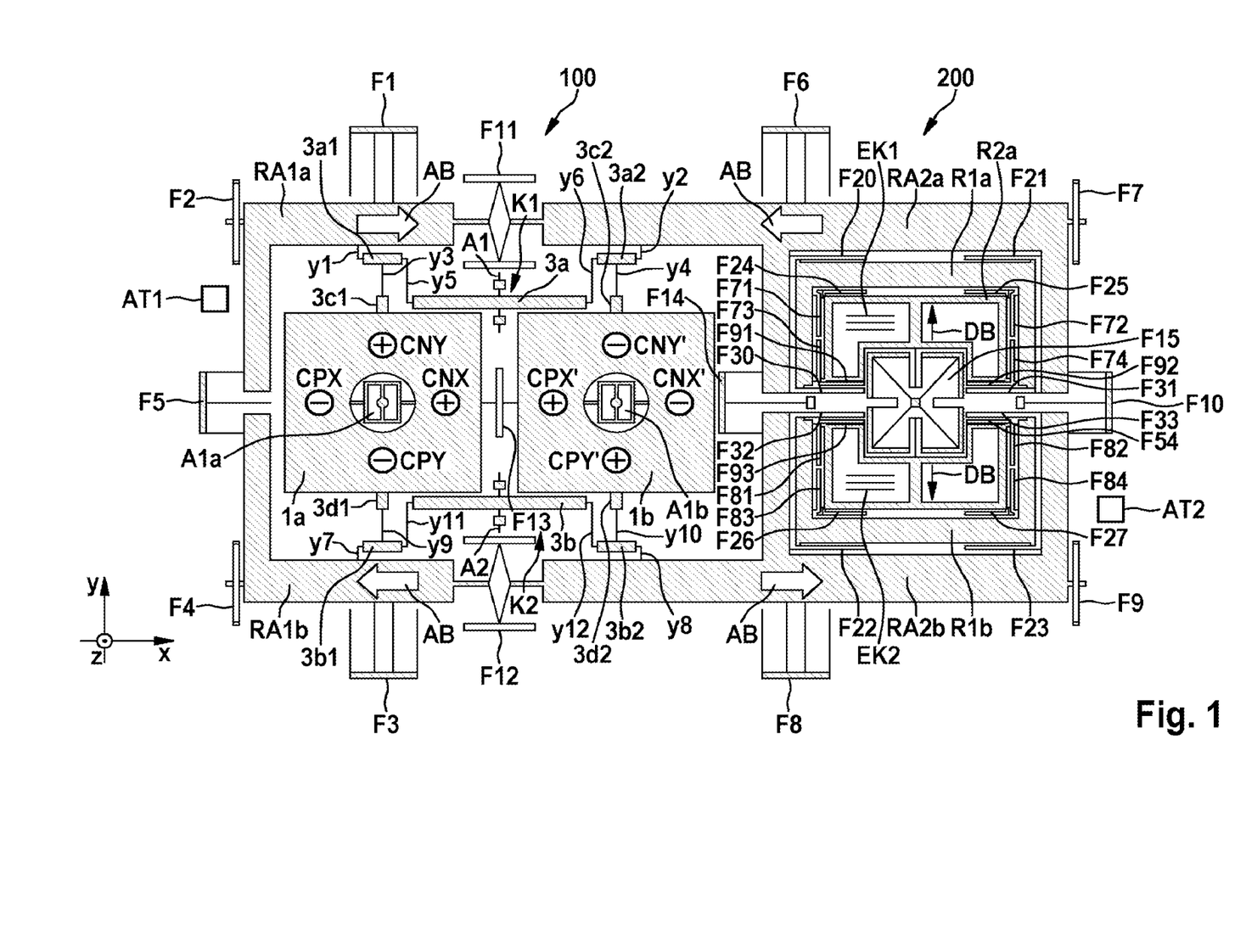
FIG. 1 shows a schematic two-dimensional representation for explaining a micromechanical rate-of-rotation sensor set-up according to a first specific embodiment of the present invention.

FIG. 1 shows a schematic two-dimensional representation for explaining a micromechanical rate-of-rotation sensor set-up according to a first specific embodiment of the present invention.

In FIG. 1, reference numeral 100 denotes a first rate-of-rotation sensor device, which may be driven rotationally about a first axis (z-axis) in an oscillatory manner, in order to measure a first outer rate of rotation about a second axis (y-axis) and a second outer rate of rotation about a third axis (x-axis). The first, second, and third axes (z, y, x) are positioned perpendicularly to each other.

The first rate-of-rotation sensor device 100 capable of being driven rotationally includes a first rotor device 1a, which may be driven about the first axis (z-axis) in an oscillatory manner, and a second rotor device 1b, which may be driven about the first axis (z-axis) in an oscillatory manner in phase opposition to first rotor device 1a.

In the first specific embodiment at hand, first rotor device 1a and second rotor device 1b are formed in the shape of a square disk; corresponding first and second suspension devices A1a, A1b being positioned and anchored in respective central cut-outs.

First rotor device 1a is tiltable due to the first outer rate of rotation about the second axis (y-axis), and due to the second outer rate of rotation about the third axis (x-axis). Second rotor device 1b is tiltable antiparallelly to first rotor device 1a due to the first outer rate of rotation about the second axis (y-axis), and due to the second outer rate of rotation about the third axis (x-axis).

First and second rotor devices 1a, 1b are coupled by a first spring device F13 in the form of a first coupling device in such a manner, that parallel tilting about the second axis (y-axis) is suppressed and antiparallel tilting about the second axis (y-axis) is enabled, namely, due to an anisotropic spring constant.

Further provided, is a second coupling device K1, K2, by which first rotor device 1a and second rotor device 1b are coupled in such a manner, that parallel tilting about the third axis (x-axis) is suppressed and antiparallel tilting about the third axis (x-axis) is enabled, namely, due to an anisotropic spring constant of second coupling device K1, K2, as well.

Second coupling device K1, K2 includes a first part K1 having a first rocker arm 3a1, which is connected to first rotor device 1a via a first spring device y3 and a connecting element 3cd. Second rocker arm 3a2 is connected to second rotor device 1b via a second spring device y4 and a connecting element 3c2. First and second rocker arms 3a1, 3a2 are connected to a third rocker arm 3a via third and fourth spring devices y4, y6, respectively. Third rocker arm 3a is attached to the substrate (not shown) by a first elastic suspension mount A1.

Second coupling device K1, K2 further includes fourth through sixth rocker arms 3b, 3b1, 3b2; fourth rocker arm 3b1 being connected to first rotor device 1a via a fifth spring device y9 and a connecting element 3d1. Fifth rocker arm 3a2 is connected to second rotor device 1b via a sixth spring device y10 and a connecting element 3d2. Fourth and fifth rocker arms 3b1, 3b2 are connected to sixth rocker arm 3b by seventh and eighth spring devices y11, y12, respectively. Sixth rocker arm 3b is attached to the substrate via a second elastic suspension mount A2.

In addition, first rocker arm 3a1 and second rocker arm 3a2 are connected to a first partial drive frame RA1a and to a second partial drive frame RA1b by a ninth and tenth spring device y1 and y2; first partial drive frame RA1a and second partial drive frame RA1b being part of a first drive frame RA1a, RA1b.

Finally, fourth rocker arm 3b1 and fifth rocker arm 3b2 are connected to a third partial drive frame RA2a and to a fourth partial drive frame RA2b via an eleventh and twelfth spring device y7 and y8; third partial drive frame RA2a and fourth partial drive frame RA2b being part of a second drive frame RA2a, RA2b.

A first detection device CPY, CNY, CPY', CNY' is used for measuring antiparallel tilting of first and second rotor devices 1a, 1b about the second axis (y-axis). A second detection device CPX, CNX, CPX', CNX' is used for measuring antiparallel tilting of first and second rotor devices 1a, 1b about the third axis (x-axis).

First detection device CPY, CNY, CPY', CNY' and second detection device CPX, CNX, CPX', CNX' include, for example, a specific plurality of capacitive plate electrodes or further electrodes, by which quadrature movements may be compensated for and/or test signals may be given, and which are situated below first and second rotor devices 1a, 1b, as is indicated schematically in FIG. 1 by respective circles.

A driving device AT1, AT2, for example, a comb drive device (only shown schematically), which includes a first drive unit AT1 and a second drive unit AT2, is provided for linearly oscillatory driving along the third axis (x-axis).

First drive unit AT1 is connected to first drive frame RA1a, RA1B.

Second drive unit AT2 is connected to second drive frame RA2a, RA2b.

First drive frame RA1*a*, RA1*b* and second drive frame RA2*a*, RA2*b* are angular and run laterally to first rotor device 1*a* in its plane.

First partial drive frame RA1*a* is connected to a substrate (not shown) by springs F1, F2. Second partial drive frame RA1*b* is connected to the substrate by springs F3, F4. In addition, first partial drive frame RA1*a* and second partial drive frame RA1*b* are interconnected by a spring F5. Springs F1 through F5 are configured in such a manner, that an oscillating motion along the third axis (x-axis) is favored.

Third partial drive frame RA2*a* is connected to the substrate (not shown) by springs F6, F7. Fourth partial drive frame RA2*b* is connected to the substrate by springs F8, F9. In addition, third partial drive frame RA2*a* and fourth partial drive frame RA2*b* are interconnected by a spring F10. Springs F6 through F10 are also configured in such a manner, that an oscillating motion along the third axis (x-axis) is favored.

Springs F10, F14 connect third partial drive frame RA2*a* and fourth partial drive frame RA2*b*.

Third partial drive frame RA2*a* and fourth partial drive frame RA2*b* surround second rotor device 1*b* and a second rate-of-rotation sensor device 200, which may be driven so as to oscillate linearly along the third axis (x-axis), is for measuring a third outer rate of rotation about the first axis (z-axis), and is explained further down.

In addition, third partial drive frame RA2*a* and fourth partial drive frame RA2*b* extend into a space between first rate-of-rotation sensor device 100 and second rate-of-rotation sensor device 200, where they are interconnected by spring F14.

In addition, first partial drive frame RA1*a* and third partial drive frame RA2*a* are connected by a spring F11, and second partial drive frame RA1*b* and fourth partial drive frame RA2*b* are interconnected by a spring F12. Springs F1*l*, F12 are configured in such a manner, that out-of-phase oscillatory motion along the third axis (x-axis) is favored and in-phase motion is suppressed. The specific direction of driving motion AB of first and second drive frames RA1*a*, RA1*b*, RA2*a*, RA2*b* is represented by respective arrows.

Second rate-of-rotation sensor device 200 includes a frame device having a first frame R1*a*, R1*b* and a second frame R2*a*, R2*b*; first frame R1*a*, R1*b* including a first subframe R1*a* and a second subframe R1*b*, and second frame R2*a*, R2*b* including a third subframe R2*a* and a fourth subframe R2*b*. Second frame R2*a*, R2*b* is surrounded by first frame RA*a*, R1*b* on three adjacent sides.

First frame R1*a*, R1*b* may be driven by second drive unit AT2 along third axis x in an oscillatory manner, via third and fourth partial drive frames RA2*a*, RA2*b* and a spring device F20-F23, F30-F33.

Second frame R2A, R2*b* is driveable indirectly by first frame R1*a*, R1*b* in an oscillatory manner, along third axis x, in phase opposition to first frame R1*a*, R1*b*, since a spring device F71-F74 is provided, by which first subframe R1*a* and third subframe R2*a* are coupled in such a manner, that in-phase deflection of first and third subframes R1*a*, R2*a* along third axis x is suppressed and out-of-phase deflection of first and third subframes R1*a*, R2*a* along third axis x is enabled. Second subframe R1*b* and fourth subframe R2*b* are coupled by an analogous spring device F81-F84 in such a manner, that in-phase deflection of second and fourth subframes R1*b*, R2*b* along third axis x is suppressed and out-of-phase deflection of second and fourth subframes R1*b*, R2*b* along third axis x is enabled.

An anisotropic spring device F24, F25, F91, F92 connects third subframe R2*a* to the substrate, an anisotropic spring device F26, F27, F93, F94 connects fourth subframe R2*b* to the substrate, and an anisotropic spring device F15 connects the substrate to third subframe R2*a* and to fourth subframe R2*b* and third subframe R2*a* and fourth subframe R2*b* to each other.

Due to the third outer rate of rotation about the first axis z, first and the second frames R1*a*, R1*b*, R2*a*, R2*b* may be deflected in phase opposition along second axis y, in an oscillatory manner. The direction of driving motion AB and the direction of detection motion DB is represented by respective arrows.

A third detection device EK1, EK2, such as a capacitive comb structure, is used for measuring out-of-phase deflection of first and second frames R1*a*, R1*b*, R2*a*, R2*b* along second axis y; in the present example, only mutual deflection of third subframe R2*a* and fourth subframe R2*b* being measured by third detection device EK1, EK2.

Figure 2:
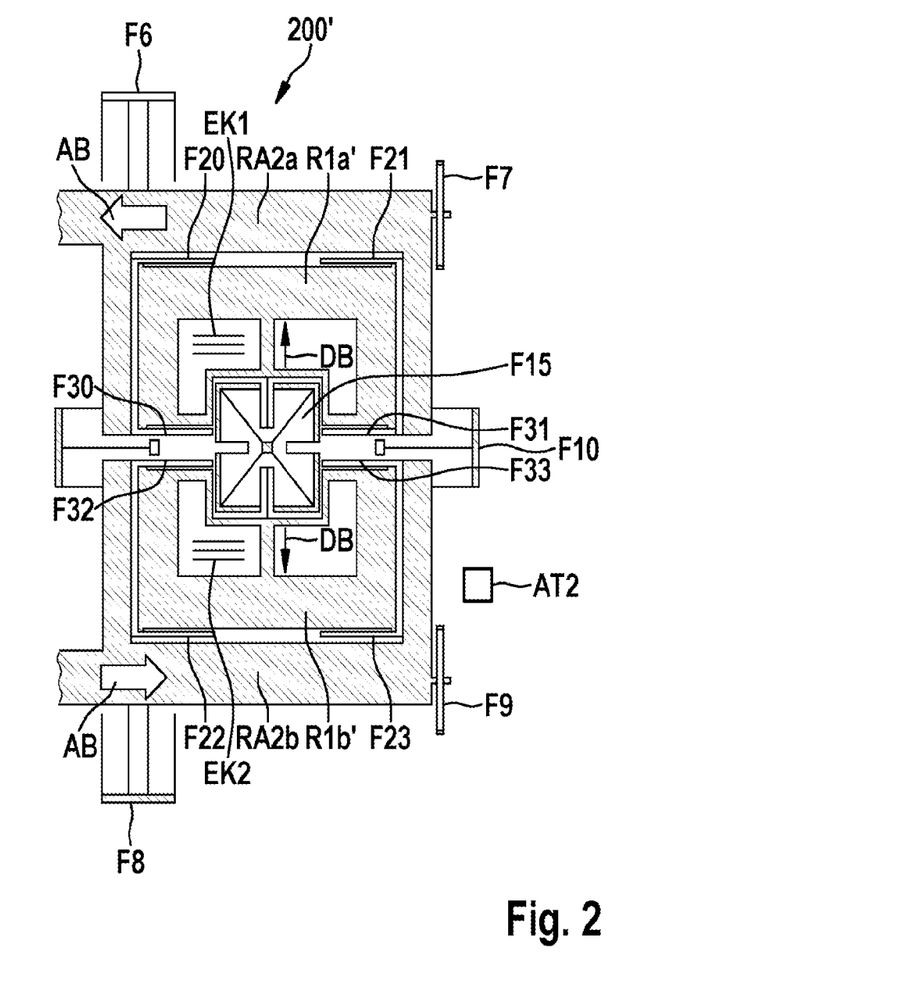
FIG. 2 shows a schematic two-dimensional representation for explaining an alternative, second rate-of-rotation sensor device, in accordance with the present invention.

FIG. 2 shows a schematic two-dimensional representation for explaining an alternative, second rate-of-rotation sensor device 200'. It includes a frame device R1*a*', R1*b*' having a first subframe R1*a*' and a second subframe R1*b*'; first subframe R1*a*', R1*b*' and second subframe R1*b*' being able to be driven along third axis x in an oscillatory manner. Due to the third outer rate of rotation about first axis z, first and second subframes R1*a*', R1*b*' may be deflected in phase opposition along second axis y, in an oscillatory manner. In particular, frame device R1*a*', R1*b*' is made up of exactly two subframes R1*a*', R1*b*' instead of the four subframes R1*a*, R2*a* R1*b*, R2*b* shown in FIG. 1.

Figure 3:
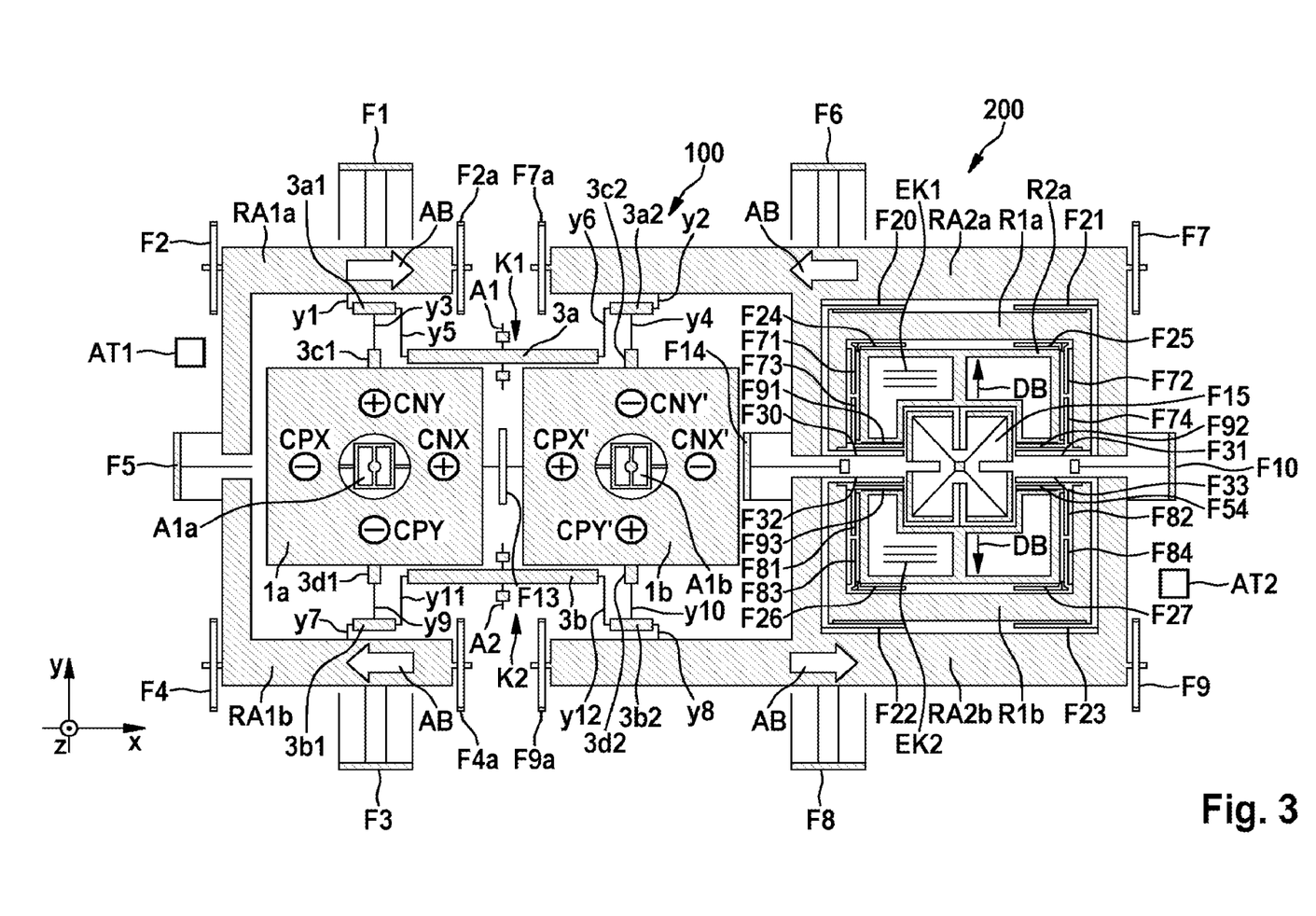
FIG. 3 shows a schematic, two-dimensional representation for explaining a micromechanical rate-of-rotation sensor set-up according to a second specific embodiment of the present invention.

FIG. 3 shows a schematic, two-dimensional representation for explaining a micromechanical rate-of-rotation sensor set-up according to a second specific embodiment of the present invention.

The second specific embodiment is constructed analogously to the first specific embodiment of FIG. 1 described above and only differs from it in that first partial drive frame RA1*a* and third partial drive frame RA2*a* are not directly interconnected, and that second partial drive frame RA1*b* and fourth partial drive frame RA2*b* are not directly interconnected, as well. First partial drive frame RA1*a* is connected to the substrate by a spring F2*a*, second partial drive frame RA1*b* is connected to the substrate by a spring F4*a*, third partial drive frame RA2*a* is connected to the substrate by a spring F7*a*, and the fourth partial drive frame is connected to the substrate by a spring F9*a*.

In the second specific embodiment, first drive frame RA1*a*, RA1*b* and second drive frame RA2*a*, RA2*b* are connected indirectly, on the one side of first rate-of-rotation sensor device 100, by above-described components y1-y6, 3*a*, 3*a*1, 3*a*2, and on the opposite side, by above-described components y7-y12, 3*b*, 3*b*1, 3*b*2.

Figure 4:
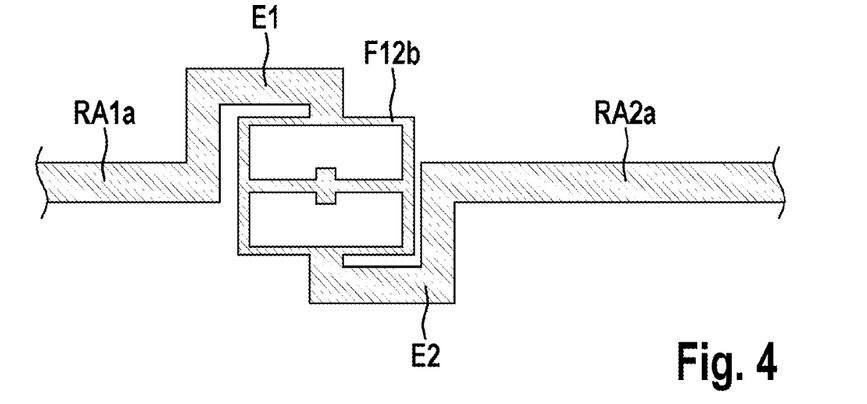
FIG. 4 shows an enlarged sectional view of a first alternative manner of coupling the first and second drive frames of the rate-of-rotation sensor set-up according to the first specific embodiment of the present invention.

FIG. 4 shows an enlarged sectional view of a first alternative manner of coupling the first and second drive frames of the rate-of-rotation sensor set-up according to the first specific embodiment of the present invention.

In the first alternative manner of coupling, first partial drive frame RA1*a* and third partial drive frame RA2*a* have angled ends E1, E2, respectively; a square spring F12*b* being inserted between ends E1, E2 and anchored in the substrate.

Figure 5:
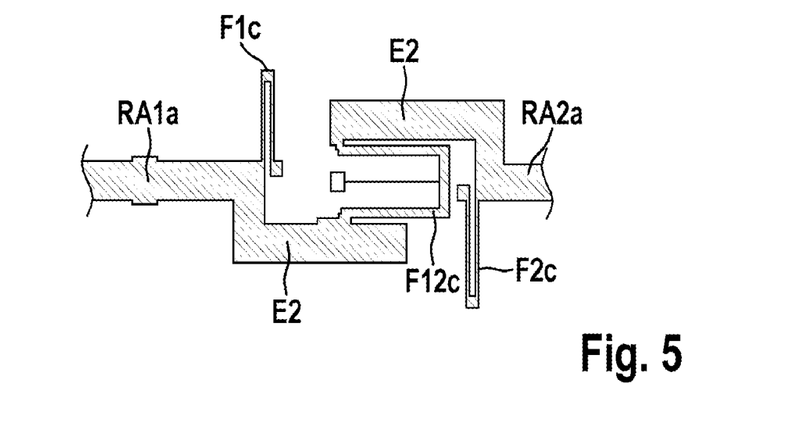
FIG. 5 shows an enlarged sectional view of a second alternative manner of coupling the first and second drive frames of the rate-of-rotation sensor set-up according to the first specific embodiment of the present invention.

FIG. 5 shows an enlarged sectional view of a second alternative manner of coupling the first and second drive frames of the rate-of-rotation sensor set-up according to the first specific embodiment of the present invention.

In the second alternative manner of coupling, first partial drive frame RA1*a* and second partial drive frame RA2*a* also have angled ends E1, E2, respectively; a U-shaped spring F12*c* being put between ends E1, E2 and anchored in the substrate. A spring F1c anchored in the substrate on first end E1 and a spring F2c of the second end, anchored in the substrate, are additionally provided in the substrate.

Figure 6:
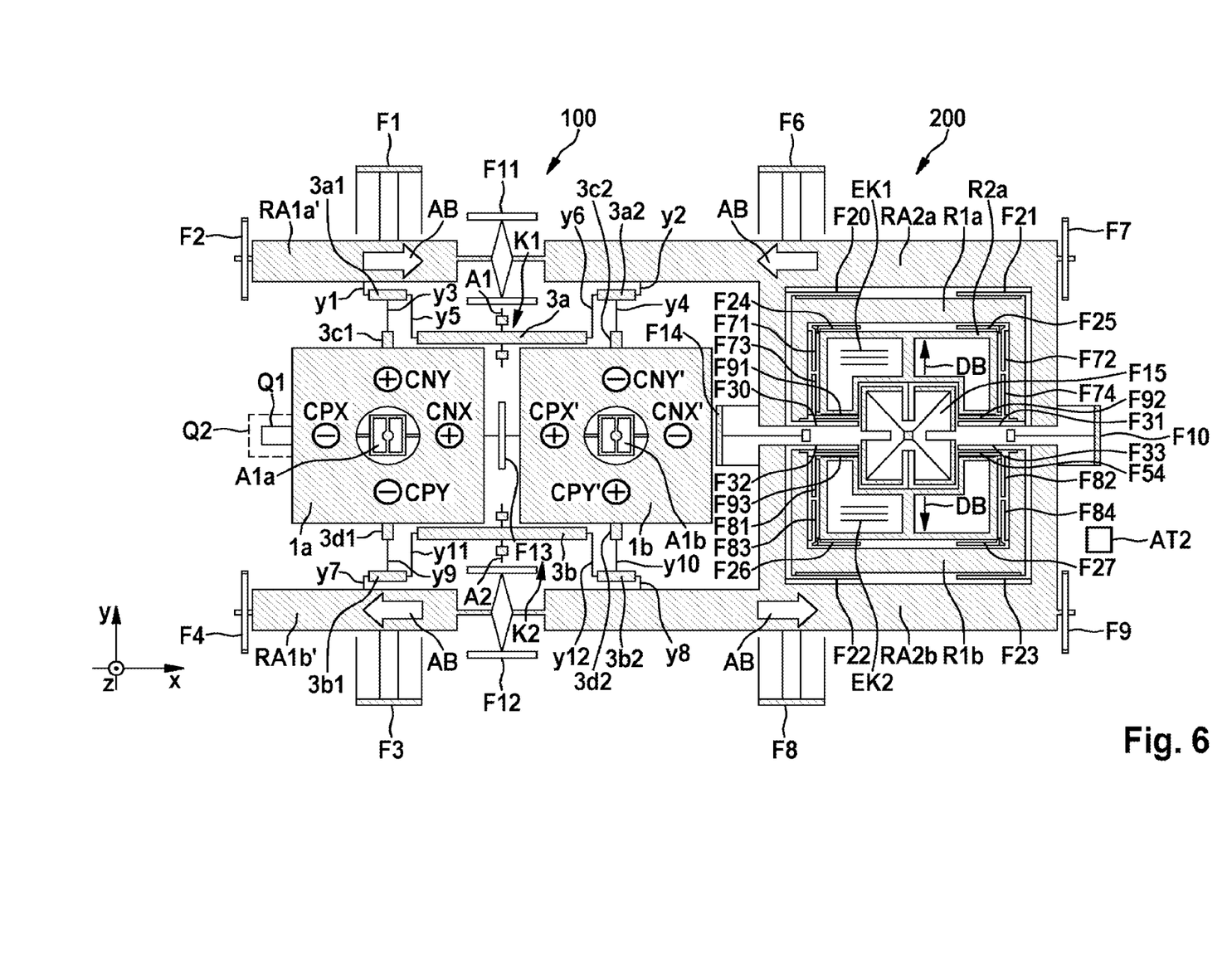
FIG. 6 shows a schematic, two-dimensional representation for explaining a micromechanical rate-of-rotation sensor set-up according to a third specific embodiment of the present invention.

FIG. 6 shows a schematic, two-dimensional representation for explaining a micromechanical rate-of-rotation sensor set-up according to a third specific embodiment of the present invention.

In the third specific embodiment, first partial drive frame RA1a' and second partial drive frame RA1b' are not angular, but straight, and are not interconnected, since spring F5 is omitted.

In particular, in this third specific embodiment, only one drive unit is provided, in this case, second drive unit AT2, which has already been described above.

Incidentally, first drive unit AT1 may be left out of all of the specific embodiments, where first drive frame RA1a, RA1b and second drive frame RA2a, RA2b are linearly coupled to each other.

Also represented schematically, is a quadrature electrode Q1, which is attached to first rotor device 1a and interacts capacitively with a quadrature electrode Q2 situated beneath it, in order to prevent movements outside of the xy-plane by applying an appropriate voltage. Of course, such quadrature electrodes may be provided at different positions of the two rotor devices 1a, 1b, in order to stabilize the operation of the first rate-of-rotation measuring device.

Figure 7A:
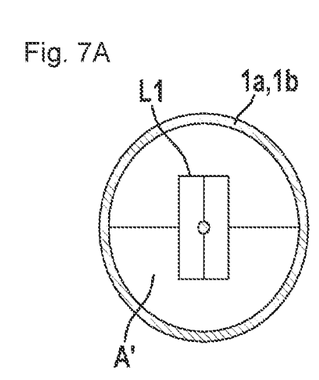
FIGS. 7A-7C show schematic two-dimensional representations to explain different spring suspension devices for the micromechanical rate-of-rotation sensor set-up according to example embodiments of the present invention.
Figure 7B:
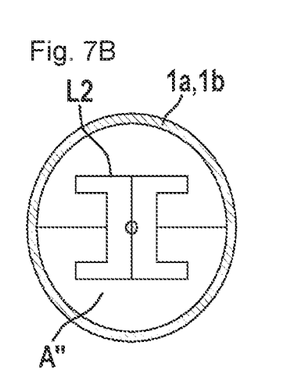
Figure 7C:
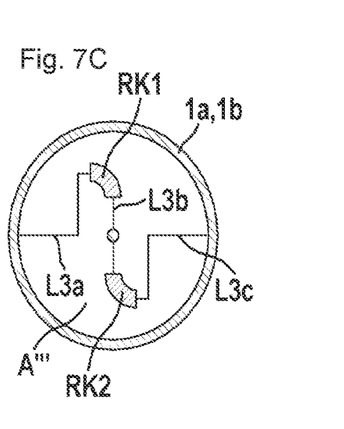

FIGS. 7A-7C show schematic two-dimensional representations to explain different spring suspension devices for the micromechanical rate-of-rotation sensor set-up according to the present invention.

In particular, three different embodiments A', A" and A''' of the first and second suspension devices Ala, Alb of the first and second rotor devices 1a, 1b are shown in FIGS. 7A-7C.

The first embodiment (FIG. 7A) includes a first folded spring L1, which may rotate about the first axis (z-axis) and may tilt about the second axis (y-axis) and third axis (x-axis).

The second embodiment (FIG. 7B) includes a spring L2, which is folded differently and has the same mechanical characteristics.

The third embodiment A1'''(FIG. 7C) includes a combination of elastic springs L3a, L3b, L3c, which are interconnected by rigid, curved arc elements RK1, RK2. Third embodiment A1''' may also rotate about the first axis (z-axis) and tilt about the second axis (y-axis) and third axis (x-axis).

In each instance, suspension devices A', A", A''' are anchored centrally to the substrate (not shown).

Figure 8:
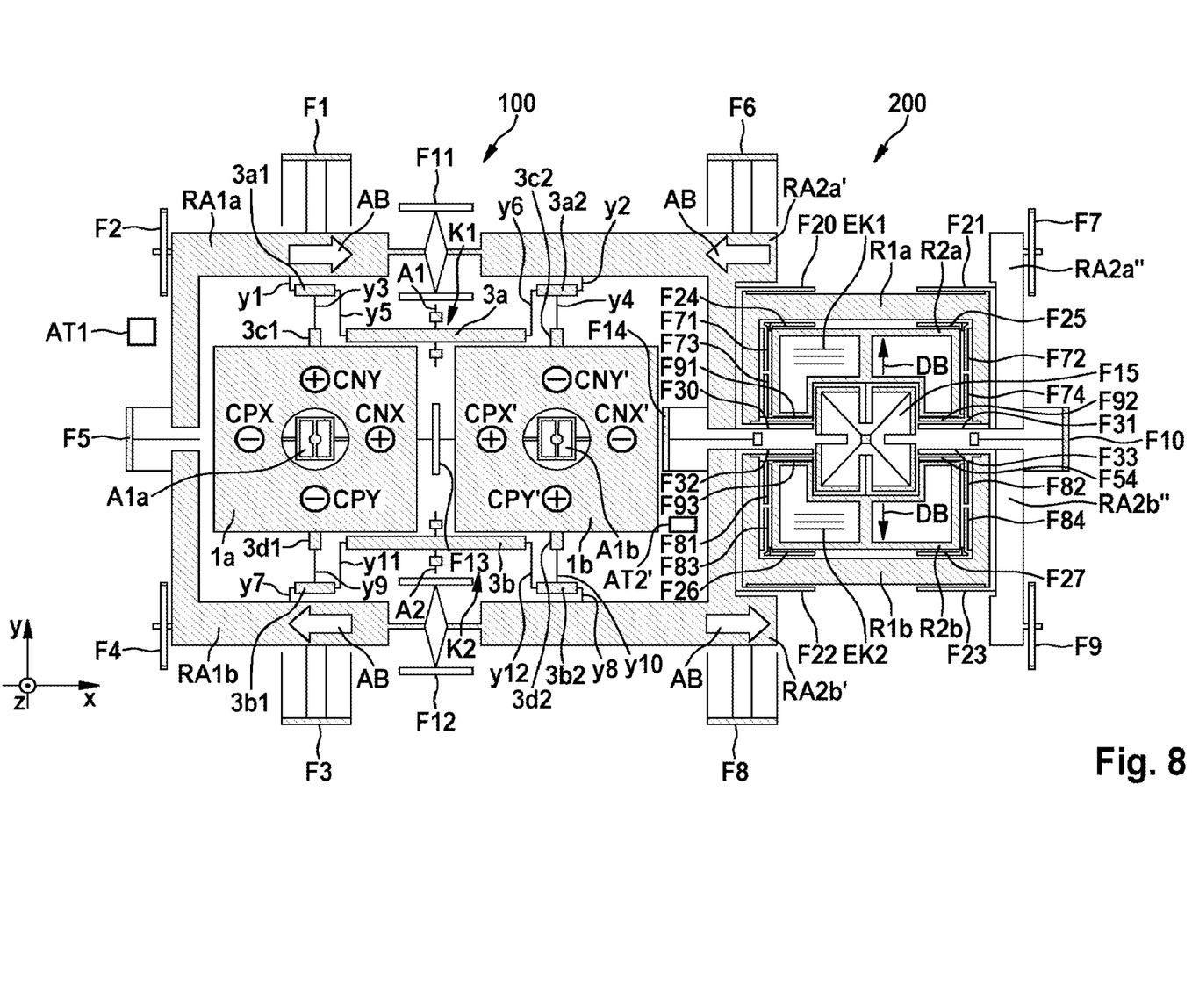
FIG. 8 shows a schematic two-dimensional representation for explaining a micromechanical rate-of-rotation sensor set-up according to a fourth specific embodiment of the present invention.

FIG. 8 shows a schematic two-dimensional representation for explaining a micromechanical rate-of-rotation sensor set-up according to a fourth specific embodiment of the present invention.

The fourth specific embodiment corresponds to the first specific embodiment; the second drive unit AT2' not being situated outside of second drive frame RA2a', RA2b', but inside of second drive frame RA2a', RA2b'.

In addition, the second drive frame is discontinuous; edge regions RA2a", RA2b" being connected to the substrate by only the springs F7, F9, but not directly to second drive unit AT2'.

Figure 9:
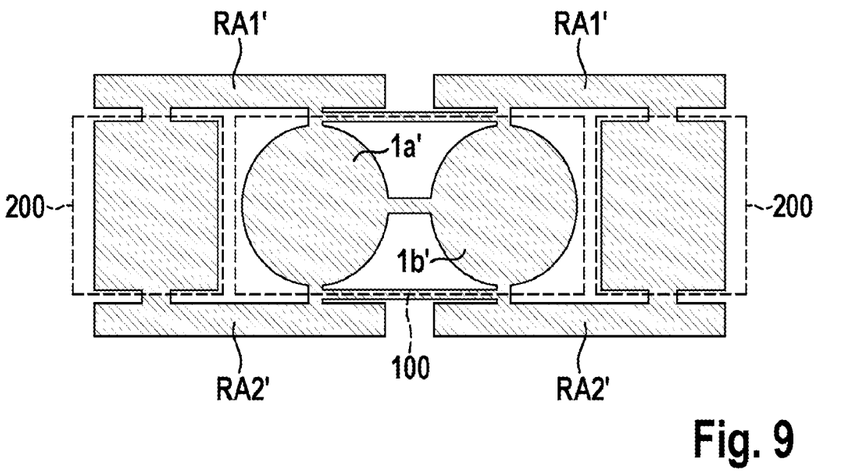
FIG. 9 shows a schematic two-dimensional representation for explaining a micromechanical rate-of-rotation sensor set-up according to a fifth specific embodiment of the present invention.

FIG. 9 shows a schematic two-dimensional representation for explaining a micromechanical rate-of-rotation sensor set-up according to a fifth specific embodiment of the present invention. It includes two second rate-of-rotation sensor devices 200, where the first rate-of-rotation sensor device 100 is connected to second rate-of-rotation sensor devices 200 by drive frame devices RA1', RA2'. The two second rate-of-rotation sensor devices 200 are positioned symmetrically to rotor devices 1a', 1b' of first rate-of-rotation sensor device 100.

The figure is to be understood as schematic. In particular, first and second rate-of-rotation sensor devices 100, 200 and drive frame devices RA1', RA2' may be any of the specific embodiments shown above.

Figure 10:
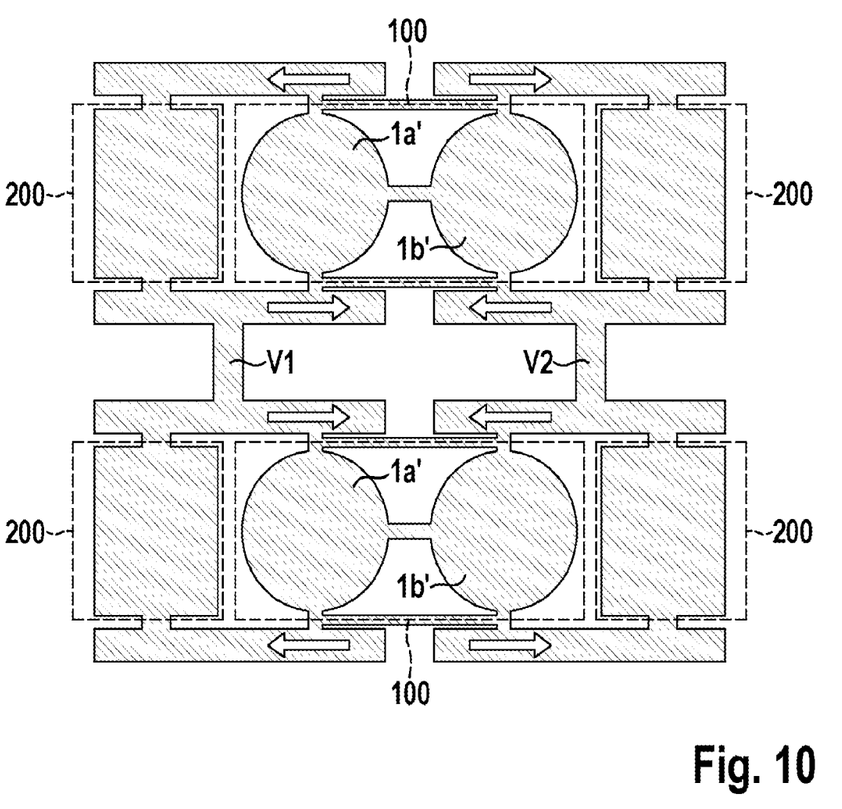
FIG. 10 shows a schematic two-dimensional representation for explaining a rate-of-rotation sensor array according to a specific embodiment of the present invention.

FIG. 10 shows a schematic two-dimensional representation for explaining a rate-of-rotation sensor array according to a specific embodiment of the present invention. The micromechanical rate-of-rotation sensor array includes a plurality of micromechanical rate-of-rotation sensor set-ups, as shown in FIG. 9, which are positioned in the form of an array and are connected to each other. The rate-of-rotation sensor set-ups are interconnected via rigid joints V1, V2.

Although the present invention has been described with the aid of preferred exemplary embodiments, it is not limited to these. In particular, the above-mentioned materials and topologies are only illustrative and are not limited to the examples explained above.

In the specific embodiments above, the geometry and symmetry of the first and second rate-of-rotation sensor devices shown are only illustrative and may be varied as needed.

What is claimed is:

1. A micromechanical rate-of-rotation sensor set-up, comprising:
    a first rate-of-rotation sensor device capable of being driven by a driving device via a drive frame device, so as to oscillate rotationally about a first axis, and is configured to measure a first outer rate of rotation about a second axis and a second outer rate of rotation about a third axis, the first, second, and third axes being positioned perpendicularly to each other; and
    a second rate-of-rotation sensor device capable of being driven by the driving device via the drive frame device, so as to oscillate linearly along the third axis, and is configured to measuring a third outer rate of rotation about the first axis;
    the first rate-of-rotation sensor device is connected to the second rate-of-rotation sensor device by the drive frame device;
    the drive frame device includes a first drive frame and a second drive frame, which are capable of being driven in phase opposition by the driving device along the third axis in an oscillatory manner;
    the first rate-of-rotation sensor device is capable of being driven rotationally and includes:
        a first rotor device which may be driven about the first axis in an oscillatory manner,
        a second rotor device which may be driven in an oscillatory manner about the first axis in phase opposition to the first rotor device,
        the first rotor device is tiltable due to the first outer rate-of-rotation about the second axis, and due to the second outer rate-of-rotation about the third axis, and the second rotor device is tiltable antiparallelly to the first rotor device, due to the first outer rate-of-rotation about the second axis and the second outer rate-of-rotation about the third axis;
        a first coupling device which has a first spring device, by which the first rotor device and the second rotor device are coupled in such a manner, that parallel tilting about the second axis is suppressed and antiparallel tilting about the second axis is enabled;
        a second coupling device by which the first rotor device and the second rotor device are coupled in such a manner, that parallel tilting about the third axis is suppressed and antiparallel tilting about the third axis is enabled;

a first detection device configured to measure antiparallel tilting of the first and second rotor devices about the second axis; and a second detection device configured to measure antiparallel tilting of the first and second rotor devices about the third axis;

wherein the second coupling device has first, second, and third rocker arms, the first rocker arm being connected to the first rotor device and to the first drive frame by spring devices, the second rocker arm being connected to the second rotor device and to the second drive frame by spring devices, and the first and second rocker arms each being connected to the third rocker arm by spring devices; and wherein the second coupling device has fourth, fifth, and sixth rocker arms, the fourth rocker arm being connected to the first rotor device and to the first drive frame by spring devices, the fifth rocker arm being connected to the second rotor device and to the second drive frame by spring devices, and the fourth and fifth rocker arms being connected to the sixth rocker arm by spring devices, respectively.

2. The micromechanical rate-of-rotation sensor set-up as recited in claim 1, wherein the second rate-of-rotation sensor device capable of being driven linearly includes:

a frame device having a first subframe and a second subframe, the first subframe and the second subframe being able to be driven along the third axis in an oscillatory manner;

wherein due to the third outer rate of rotation about the first axis, the first and second subframes being able to be deflected in phase opposition along the second axis, in an oscillatory manner.

3. The micromechanical rate-of-rotation sensor set-up as recited in claim 1, wherein the second rate-of-rotation sensor device capable of being driven linearly includes:

a frame device having a first frame and a second frame;

the second frame being at least partially surrounded by the first frame;

the first frame being able to be driven along the third axis in an oscillatory manner, and the second frame being able to be driven along the third axis in an oscillatory manner, in phase opposition to the first frame;

due to the third outer rate of rotation about the first axis, the first and second frames being able to be deflected in phase opposition along the second axis, in an oscillatory manner;

the first frame includes a first subframe and a second subframe, and the second frame including a third subframe and a fourth subframe;

a third coupling device, by which the first subframe and the third subframe are coupled in such a manner, that in-phase deflection of the first and third subframes along the third axis is suppressed and out-of-phase deflection of the first and third subframe along the third axis is enabled;

a fourth coupling device, by which the second subframe and the fourth subframe are coupled in such a manner, that in-phase deflection of the second and fourth subframes along third axis is suppressed and out-of-phase deflection of the second and fourth subframes along the third axis is enabled; and a third detection device configured to measure out-of-phase deflection of the first and second frames along the second axis.

4. The micromechanical rate-of-rotation sensor set-up as recited in claim 1, further comprising:

a coupling device which connects the first drive frame and the third partial drive frame, and a coupling device connecting the second partial drive frame and the fourth partial drive frame.

5. The micromechanical rate-of-rotation sensor set-up as recited in claim 1, wherein the driving device includes a first drive unit configured to drive the first drive frame and a second drive unit configured to drive the second drive frame.

6. The micromechanical rate-of-rotation sensor set-up as recited in claim 1, wherein the driving device has a single common drive unit configured to drive the first drive frame and to drive the second drive frame.

7. The micromechanical rate-of-rotation sensor set-up as recited in claim 1, further comprising:

one or more test signal electrodes are situated below the first and/or second rotor device.

8. The micromechanical rate-of-rotation sensor set-up as recited in claim 1, wherein the first and/or second rotor device have one or more quadrature electrodes, which are configured to interact with quadrature electrodes situated beneath them.

9. The micromechanical rate-of-rotation sensor set-up as recited in claim 1, wherein the first detection device and the second detection device have a specific plurality of capacitive plate electrodes, which are positioned below the first and second rotor devices.

10. The micromechanical rate-of-rotation sensor set-up as recited in claim 3, wherein the third detection device has a plurality of capacitive comb electrodes, which are situated inside of the first and second frames.

11. The micromechanical rate-of-rotation sensor set-up as recited in claim 1, further comprising:

a further, second rate-of-rotation sensor device, the first rate-of-rotation sensor device being connected to the further, second rate-of-rotation sensor device by the drive frame device.

12. A micromechanical rate-of-rotation sensor array, comprising:

a plurality of micromechanical rate-of-rotation sensor set-ups positioned in the form of an array and connected to each other, each of the micromechanical rate-of-rotation setups including:

a first rate-of-rotation sensor device capable of being driven by a driving device via a drive frame device, so as to oscillate rotationally about a first axis, and is configured to measure a first outer rate of rotation about a second axis and a second outer rate of rotation about a third axis, the first, second, and third axes being positioned perpendicularly to each other; and a second rate-of-rotation sensor device capable of being driven by the driving device via the drive frame device, so as to oscillate linearly along the third axis, and is configured to measuring a third outer rate of rotation about the first axis;

the first rate-of-rotation sensor device is connected to the second rate-of-rotation sensor device by the drive frame device;

the drive frame device includes a first drive frame and a second drive frame, which are capable of being driven in phase opposition by the driving device along the third axis in an oscillatory manner;

the first rate-of-rotation sensor device is capable of being driven rotationally and includes:
a first rotor device which may be driven about the first axis in an oscillatory manner,
a second rotor device which may be driven in an oscillatory manner about the first axis in phase opposition to the first rotor device,
the first rotor device is tiltable due to the first outer rate-of-rotation about the second axis, and due to the second outer rate-of-rotation about the third axis, and the second rotor device is tiltable antiparallelly to the first rotor device, due to the first outer rate-of-rotation about the second axis and the second outer rate-of-rotation about the third axis;
a first coupling device which has a first spring device, by which the first rotor device and the second rotor device are coupled in such a manner, that parallel tilting about the second axis is suppressed and antiparallel tilting about the second axis is enabled;
a second coupling device by which the first rotor device and the second rotor device are coupled in such a manner, that parallel tilting about the third axis is suppressed and antiparallel tilting about the third axis is enabled;
a first detection device configured to measure antiparallel tilting of the first and second rotor devices about the second axis; and
a second detection device configured to measure antiparallel tilting of the first and second rotor devices about the third axis;
wherein the second coupling device has first, second, and third rocker arms, the first rocker arm being connected to the first rotor device and to the first drive frame by spring devices, the second rocker arm being connected to the second rotor device and to the second drive frame by spring devices, and the first and second rocker arms each being connected to the third rocker arm by spring devices; and
wherein the second coupling device has fourth, fifth, and sixth rocker arms, the fourth rocker arm being connected to the first rotor device and to the first drive frame by spring devices, the fifth rocker arm being connected to the second rotor device and to the second drive frame by spring devices, and the fourth and fifth rocker arms being connected to the sixth rocker arm by spring devices, respectively.

13. A method of manufacturing a micromechanical rate-of-rotation sensor set-up, comprising the following steps:
forming a drive frame device which includes a first drive frame and a second drive frame, which are drivable by a driving device in phase opposition, along the third axis, in an oscillatory manner;
forming a first rate-of-rotation sensor device which is capable of being driven rotationally by the driving device via the drive frame device, so as to oscillate about a first axis, and is configured to measure a first outer rate of rotation about a second axis and a second outer rate of rotation about a third axis, the first, second, and third axes being positioned perpendicularly to each other;
forming a second rate-of-rotation sensor device which is capable of being driven by the driving device via the drive frame device, so as to oscillate linearly along the third axis, and is configured to measure a third outer rate of rotation about the first axis; and
connecting the first rate-of-rotation sensor device to the second rate-of-rotation sensor device via the drive frame device;
the first rate-of-rotation sensor device capable of being driven rotationally including:
a first rotor device which may be driven about the first axis in an oscillatory manner;
a second rotor device which may be driven in an oscillatory manner about the first axis in phase opposition to the first rotor device;
the first rotor device being tiltable due to the first outer rate-of-rotation about the second axis, and due to the second outer rate-of-rotation about the third axis, and the second rotor device being tiltable antiparallelly to the first rotor device, due to the first outer rate-of-rotation about the second axis and the second outer rate-of-rotation about the third axis;
a first coupling device, which has a first spring device, by which the first rotor device and the second rotor device are coupled in such a manner, that parallel tilting about the second axis is suppressed and antiparallel tilting about the second axis is enabled;
a second coupling device, by which the first rotor device and the second rotor device are coupled in such a manner, that parallel tilting about the third axis is suppressed and antiparallel tilting about the third axis is enabled;
a first detection device configured to measure antiparallel tilting of the first and second rotor devices about the second axis; and
a second detection device configured to measure antiparallel tilting of the first and second rotor devices about the third axis;
wherein:
the second coupling device has first, second, and third rocker arms, the first rocker arm being connected to the first rotor device and to the first drive frame by spring devices, the second rocker arm being connected to the second rotor device and to the second drive frame by spring devices, and the first and second rocker arms each being connected to the third rocker arm by spring devices; and
the second coupling device has fourth, fifth, and sixth rocker arms, the fourth rocker arm being connected to the first rotor device and to the first drive frame by spring devices, the fifth rocker arm being connected to the second rotor device and to the second drive frame by spring devices, and the fourth and fifth rocker arms being connected to the sixth rocker arm by spring devices, respectively.

\* \* \* \* \*